(12) United States Patent
Weseman

(10) Patent No.: US 6,644,908 B1
(45) Date of Patent: Nov. 11, 2003

(54) RAMP AUTO LATCH SYSTEM

(75) Inventor: Brian H. Weseman, Grove City, MN (US)

(73) Assignee: Towmaster, Inc., Litchfield, MN (US)

( * ) Notice: Subject to any disclaimer, the term of this patent is extended or adjusted under 35 U.S.C. 154(b) by 52 days.

(21) Appl. No.: 09/728,777

(22) Filed: Dec. 1, 2000

Related U.S. Application Data

(60) Provisional application No. 60/175,812, filed on Jan. 12, 2000.

(51) Int. Cl.$^7$ .................................................. B60P 1/43
(52) U.S. Cl. ...................... 414/537; 414/813; 298/23 A
(58) Field of Search ......................... 298/23 A; 296/61, 296/57.1, 58; 414/537, 538, 812, 813; 14/69.5, 71.1

(56) References Cited

U.S. PATENT DOCUMENTS

| | | | | |
|---|---|---|---|---|
| 2,136,010 A | * | 11/1938 | Housdorfer | 414/537 X |
| 2,767,016 A | * | 10/1956 | Wood | 414/537 |
| 3,338,440 A | * | 8/1967 | Donahue | 414/482 |
| 3,674,303 A | * | 7/1972 | Doonan et al. | 296/24.2 |
| 3,830,384 A | * | 8/1974 | Barber | 414/556 |
| 4,380,415 A | * | 4/1983 | Higginson et al. | 414/537 |
| 4,514,132 A | | 4/1985 | Law | |
| 4,693,651 A | | 9/1987 | Stuart | |
| 4,795,304 A | * | 1/1989 | Dudley | 414/537 |
| 4,850,788 A | | 7/1989 | Dickson | |
| 4,989,518 A | | 2/1991 | Kealey | |
| 5,035,565 A | | 7/1991 | White | |
| 5,145,310 A | | 9/1992 | Calzone | |
| 5,215,426 A | | 6/1993 | Bills | |
| 5,306,113 A | * | 4/1994 | Mann | 414/537 |
| 5,462,249 A | | 10/1995 | Calzone | |
| 5,598,595 A | | 2/1997 | Flinchum | |
| 5,649,732 A | | 7/1997 | Jordan | |
| 5,836,734 A | * | 11/1998 | Doering | 414/723 |
| 5,857,825 A | | 1/1999 | Rice | |
| 5,895,066 A | * | 4/1999 | Headlee | 280/414.1 |
| 5,938,397 A | | 8/1999 | Schouest | |
| 6,068,324 A | * | 5/2000 | DeKlotz | 296/61 X |
| 6,120,081 A | * | 9/2000 | Collins | 414/537 X |
| 2001/0033787 A1 | * | 10/2001 | Eekhoff | 414/537 |
| 2003/0017039 A1 | * | 1/2003 | Young et al. | 414/537 |

* cited by examiner

*Primary Examiner*—James W. Keenan
(74) *Attorney, Agent, or Firm*—Patterson, Thuente, Skaar & Christensen, P.A.

(57) ABSTRACT

An auto latch system for use with a transport vehicle having a ramp that is pivotable between a transport disposition and an extended disposition. The auto latch system includes a latch assembly operably coupled to a transport vehicle bed. A ramp engagement assembly is operably coupled to the ramp. The latch assembly automatically engages the ramp engagement assembly during pivoting of the ramp from the extended disposition to the transport disposition.

14 Claims, 3 Drawing Sheets

RAMP AUTO LATCH SYSTEM

REFERENCE TO RELATED APPLICATION

The present application claims priority to U.S. Provisional Application No. 60/175,812, which was filed on Jan. 12, 2000, and which is incorporated herein in its entirety by reference.

TECHNICAL FIELD

The present invention relates to transport vehicles, such as trailers. More particularly, the present invention relates to transport vehicles having rotatable loading ramps coupled to the rear of the transport vehicle.

BACKGROUND OF THE INVENTION

Transport vehicles with rotatable loading ramps are known. The loading ramps are rotatable between a generally upright transport disposition and an extended disposition in which the ramps extend from the rear of the transport vehicle to the ground. In the transport disposition, the ramps are typically held in the upright position by pins inserted through bores defined in fixed brackets and a bore defined in the ramp. While such means of locking the ramps in the transport disposition is adequate, it presents some difficulty in insertion of the pins. The ramps typically are quite heavy and must be maneuvered with one hand to bring the bore defined in the bracket and the bore defined in the ramp into alignment for insertion of the pin with the second hand. Additionally, the pins have known to become detached and lost.

In view of the foregoing, there is a need in the industry for a latching system to automatically engage when the ramp is rotated into its upright, transport disposition.

SUMMARY OF THE INVENTION

The ramp auto latch system of the present invention substantially meets the aforementioned needs of the industry. The auto latch system is permanently affixed to the transport vehicle to prevent loss. The auto latch system automatically engages when the ramp is maneuvered into its upright, transport disposition. No manual intervention is required in order to effect engagement of the auto latch system with the ramp. This configuration of the present invention frees up both hands of the operator for maneuvering the ramp into the transport disposition. Further, the auto latch system of the present invention is biased in the engaged disposition to ensure that engagement with the ramp is maintained during over the road transportation of the vehicle.

The present invention is an auto latch system for use with a transport vehicle having a rotatable ramp shiftable between a transport disposition and an extended disposition. The auto latch system includes a latch assembly operably coupled to a transport vehicle bed. A ramp engagement assembly is operably coupled to the ramp. The latch assembly automatically engages the ramp engagement assembly during pivoting of the ramp from the extended disposition to the transport disposition.

DETAILED DESCRIPTION OF THE PREFERRED EMBODIMENTS

Figure 1:
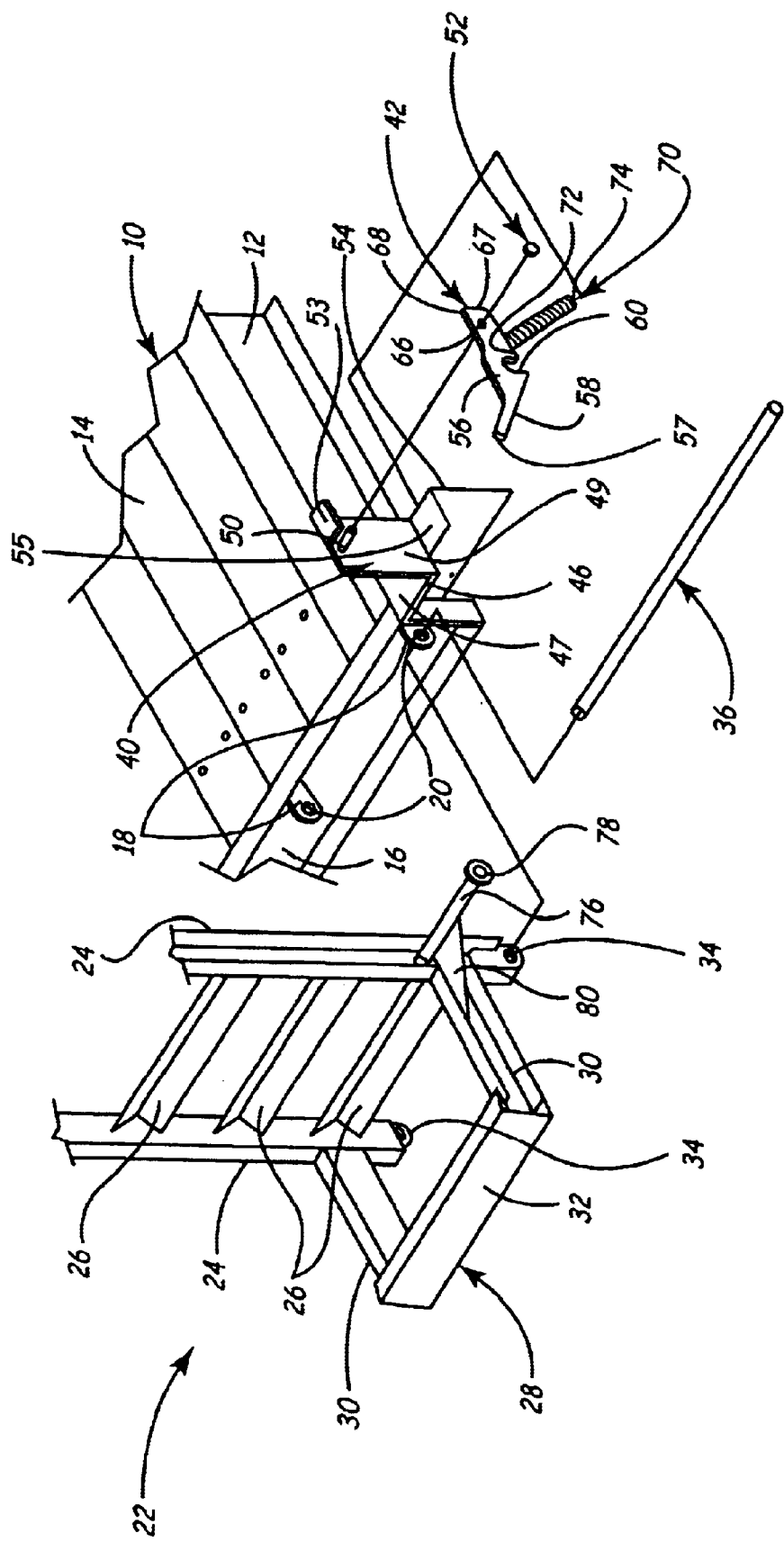
FIG. 1 is an exploded, perspective view of the auto latch system of the present invention in relation to the transport vehicle and the transport vehicle ramp, the transport vehicle ramp being in the transport disposition.
Figure 2:
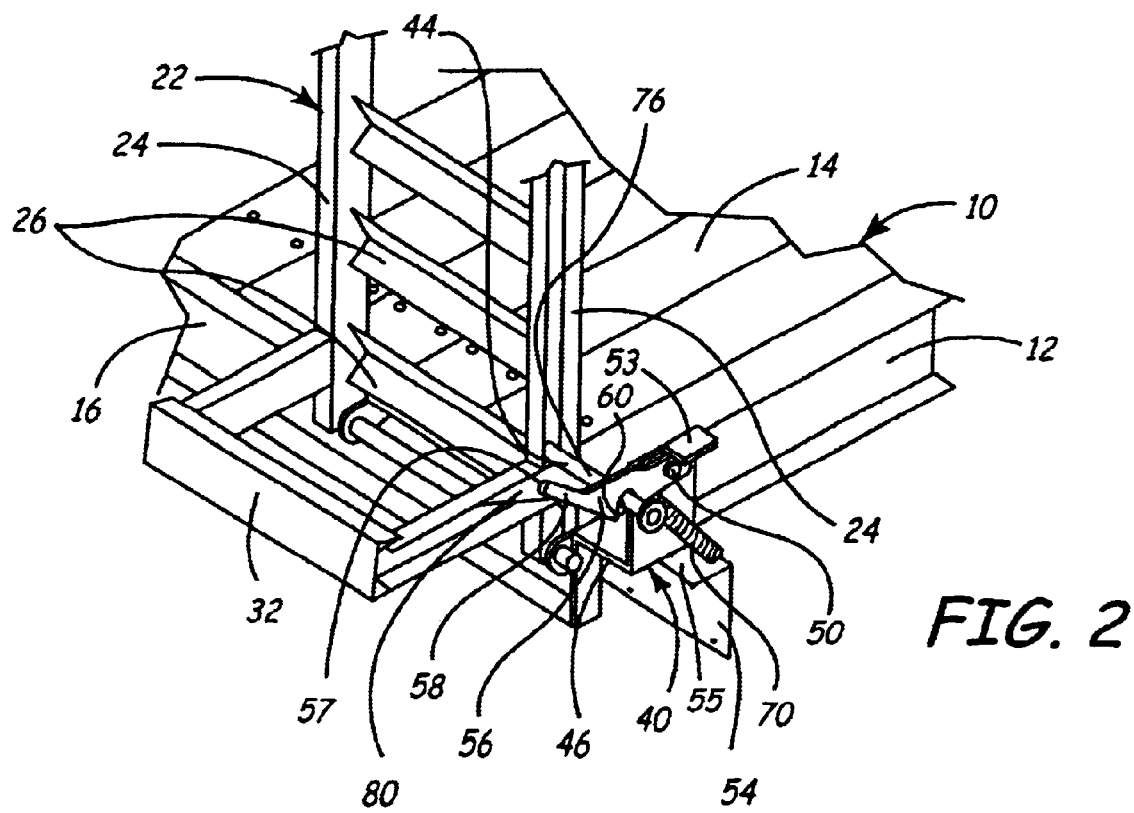
FIG. 2 is an assembled, perspective view of the auto latch system of FIG. 1.

A ramp auto latch system of the present invention is designed to be utilized with a transport vehicle, such as a trailer. The left rear portion of the vehicle with the ramp that is rotatably couplable thereto is depicted in FIGS. 1 and 2. It is understood that typically, the right rear portion of a transport vehicle would have a similar configuration and ramp.

The vehicle bed 10 is comprised of a frame 12, the frame 12 supporting decking 14. The decking 14 may be formed of wooden planks affixed to the frame 12. The frame 12 includes a rear cross member 16 that extends widthwise across the rear of the vehicle bed 10. A pair of spaced apart brackets 18 are fixedly coupled to the rear cross member 16 and extend rearward therefrom. Each of the brackets 18 has an eye 20 defined therein.

A ramp 22 is rotatably coupled to the rear of the vehicle bed 10. The ramp 22 has a pair of spaced apart, generally parallel side rails 24. A plurality of cross ties 26 extend between the side rails 24 for supporting the wheels of a vehicle being loaded onto the vehicle bed.

A support member 28 extends generally orthogonally with respect to the side rails 24. The support member 28 has a pair of sides 30 affixed to respective side rails 24. A cross support 32 extends between the distal ends of the sides 30. An eye 34 is affixed to an end of each of the side rails 24 of the ramp 22. To attach the ramp 22 to the vehicle bed 10, the eyes 34 are brought into registry with the eyes 20 and the ramp 22 is rotatably coupled to the vehicle bed 10 by means of a rod hinge 36 passed through the eyes 20, 34.

The ramp 22 is pivotable between a generally upright transport disposition, as depicted in FIGS. 1 and 2, and an extended disposition in which the ramp 22 is rotated downward so that the distal end (not shown) of the ramp 22 engages the ground. In this disposition, the ramp 22 is essentially a slightly depending extension of the surface of decking 14.

The support member 28 extends downward from the rear of the vehicle bed 10 in a position in which the cross support 32 is in close proximity to the ground surface underlying the rear of the vehicle bed 10. As a heavy vehicle is transported up the ramp 22 the rear of vehicle bed 10 is depressed slightly and the cross support 32 comes into engagement with the ground to assist in supporting the rear of the vehicle bed 10 during unloading or off loading of a vehicle therefrom.

Typically, the ramp 22 is formed of heavy gauge steel material and weighs a substantial amount, on the order of 75–150 pounds. An operator typically grasps the distal end of the ramp 22 to rotate the ramp 22 between the extended disposition and the transport disposition. As can be appreciated, the weight of the ramp 22 itself assists in translation of the ramp 22 between the transport disposition and the extended disposition, while the ramp 22 must be lifted with considerable effort to rotate the ramp 22 from the extended disposition to the transport disposition.

The auto latch system of the present invention is depicted generally at 40 in the figures. The auto latch system 40 has two major components: latch assembly 42 and ramp engagement assembly 44.

The latch assembly 42 has two major subcomponents: a latch bracket 46 and a latch handle assembly 48. The latch bracket 46 is fixedly coupled to the frame 12 of the vehicle bed 10, preferably by welding. The latch bracket 46 is generally L-shaped having a first generally horizontal leg 47 with a generally upwardly directed second leg 49 fixedly coupled thereto. An outwardly directed pivot arm 50 is fixedly coupled to the second leg 49.

The pivot arm 50 is preferably a ⅝ inch, partially threaded rod welded to the second leg 49. A nut 52 is provided for threaded engagement with the pivot arm 50. Preferably, the nut 52 is a self-locking type of nut such as a NYLOCK nut. An outwardly directed stop plate 53 is generally horizontally disposed and is coupled to the upper margin of the second leg 49.

A generally horizontal extension 54 extends outward from the intersection of the first leg 47 and the second leg 49. The extension 54 is generally disposed beneath and spaced apart from the stop plate 53. A spring groove 55 is defined in the leading edge margin of the extension 54.

Figure 3:
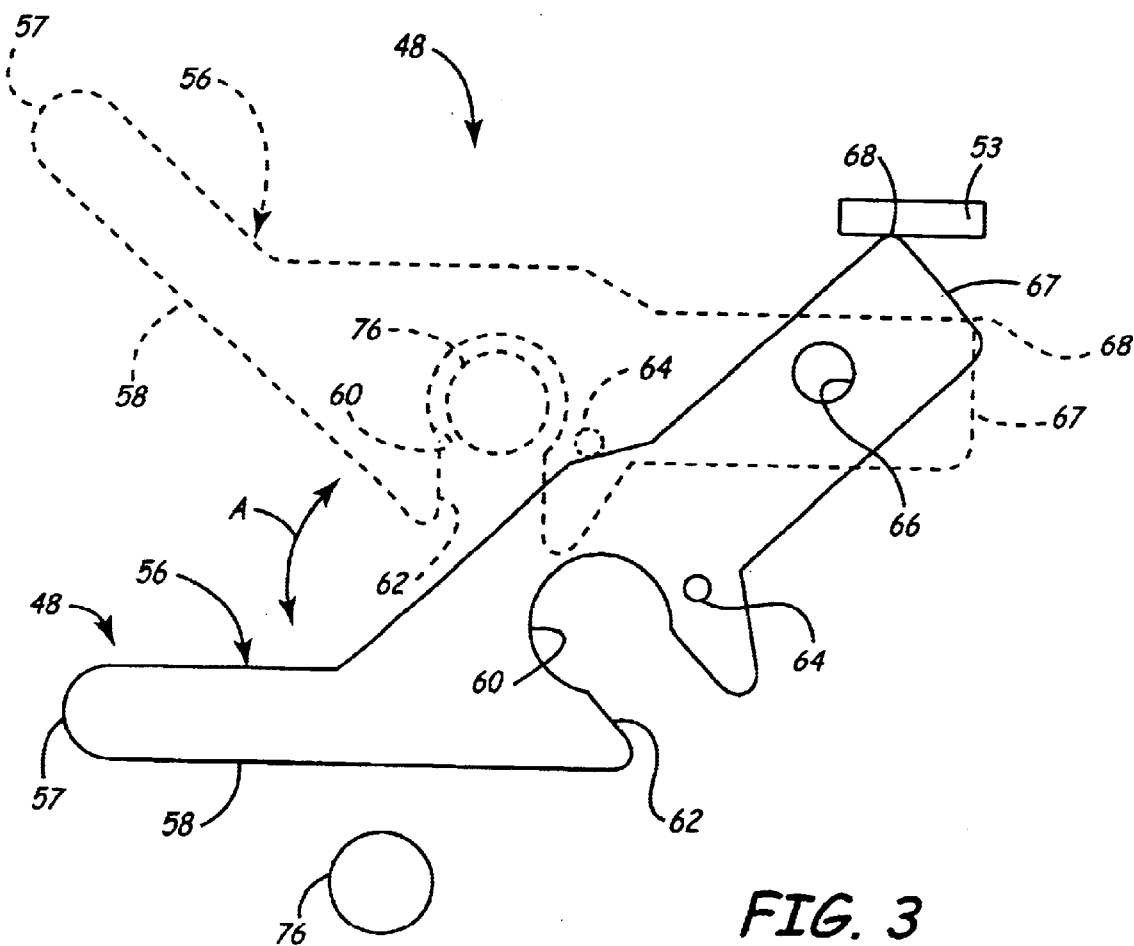
FIG. 3 is a side elevational view of the latch handle assembly in its disengaged disposition with the engaged disposition depicted in phantom.

The latch handle assembly 48 of the latch assembly 42 includes a handle 56. Referring to FIG. 3 in addition to FIGS. 1 and 2, the handle 56 has an elongated ramp engaging margin 58. A ramp retention groove 60 is defined adjacent to the ramp engaging margin 58. Admission to the ramp retention groove 60 is provided by a groove throat 62. It should be noted that preferably, the width of the groove throat 62 is somewhat less than the diameter of the ramp retention groove 60.

A relatively small spring bore 64 is defined in the handle 56 adjacent to the ramp retention groove 60. A pivot bore 66 is defined in the handle 56 proximate a distal end 67 of the handle 56. A stop margin 68 is presented at a corner of the distal end 67 for engaging the underside of the stop plate 53. In assembly, the pivot bore 66 of the handle 56 is positioned over the pivot arm 50 and the nut 52 is threaded onto the pivot arm 50 to engage the handle 56 with the latch bracket 46.

A spring 70 biases the handle 56 in a counterclockwise direction about the pivot arm 50. The spring 70 has a first spring end 72 engaged in the spring bore 64 of the handle 56 and a second end 74 engaged in the spring groove 55 of the extension 54.

The second component of the auto latch system 40 is the ramp engagement assembly 44. The ramp engagement assembly 44 is fixedly coupled to the ramp 22. The ramp engagement assembly 44 includes an outwardly directed rod 76 that is welded at a proximal end to the outboard side rail 24 of the ramp 22. The rod 76 is disposed in a generally orthogonal relationship with the side rail 24. A rod end 78 that preferably comprises a washer is welded to the distal end of the rod 76. A supporting gusset 80 extends between the outboard side 30 of the support member 28 of the rod 76.

The latch handle assembly 48 has two different dispositions as depicted in FIG. 3. The first disposition is the extended disposition depicted by solid lines. The second disposition is the transport disposition as depicted in phantom in FIG. 3. In the extended disposition, the latch handle assembly 48 is disengaged from the ramp engagement assembly 44. The rod 76 of the ramp engagement assembly 44 lies beneath and spaced apart from the latch handle assembly 48. The handle 56 of the latch handle assembly 48 is supported by engagement of the stop margin 68 with the underside of the stop plate 53.

In the transport disposition, the ramp retention groove 60 of the handle 56 is in engagement with the rod 76 of the ramp engagement assembly 44. The bias exerted by the spring 70 holds the ramp retention groove 60 of the latch handle assembly 48 into engagement with the rod 76.

In operation, to transition the ramp 22 from the extended disposition to the transport disposition, the operator grasps the distal end of the ramp 22 and raises the ramp 22. This motion causes the ramp 22 to rotate about the rod hinge 36. This motion causes the rod 76 to move in an arc as indicated by arrow A. As the ramp 22 is rotated upward, the surface of the rod 76 engages the ramp engaging margin 58 of the handle 56. Further rotation of the ramp 22 causes the rod 76 to translate toward the groove throat 62 of the handle 56.

At a point in the upward translation of the ramp 22, the rod 76 drops into the groove throat 62 and further into the ramp retention groove 60, as depicted in phantom in FIG. 3. The upward rotation for the handle 56 as indicated by the arrow A acts to extend the spring 70, thereby increasing the rotational bias exerted by the spring 70 on the handle 56. As previously described, the latching of the ramp 22 in the transport disposition is accomplished automatically simply by raising the ramp 22 from the extended disposition to the transport disposition.

To transition the ramp 22 from the transport disposition to the extended disposition, an operator pushes forward slightly on the upwardly directed ramp 22 while grasping the handle 56 proximate the proximal end 57 thereof. The handle 56 is rotated upward such that the rod 66 passes from the ramp retention groove 60 through the groove throat 62 and free of the handle 56. At this point, the ramp 22 may be rotated slightly rearward and the handle 56 released. The ramp engaging margin 58 of the handle 56 will then come into engagement with the rod 76 and remain in engagement with the rod 76 through the downward rotation of the ramp 22 until the stop margin 68 engages the underside of the stop plate 53 as depicted in the solid representation of FIG. 3.

It is contemplated that features disclosed in this application, as well as those described in the above applications incorporated by reference, can be mixed and matched to suit particular circumstances. Various other modifications and changes will be apparent to those of ordinary skill.

What is claimed is:

1. An auto latch system for use with a transport vehicle having a bed, a frame disposed about the edge of the bed and a ramp that is pivotable between a transport disposition and an extended disposition, the ramp being pivotably mounted on an edge of the vehicle frame via a mounting arrangement disposed at one edge of the ramp, the auto latch system comprising:

a latch assembly adapted to be mounted on the transport vehicle frame edge, wherein the latch assembly includes a handle pivotably attached to the transport vehicle frame edge and is disposed adjacent the bed and includes a ramp retention groove formed therein; and a ramp engagement assembly adapted to be mounted adjacent the mounting arrangement of the ramp, wherein the latch assembly handle engages the ramp engagement assembly adjacent the vehicle frame edge during pivoting of the ramp, from the extended disposition to the transport disposition, and is raised by the ramp such that the ramp retention groove receives the ramp engagement assembly as the ramp is moved into the transport disposition.

2. The auto latch system of claim 1, wherein the handle also has a groove throat formed therein proximate an entrance to the ramp retention groove, wherein the groove throat has a width that is smaller than a width of the ramp retention groove.

3. The auto latch system of claim 1, and further comprising a spring that biases the handle towards the ramp engagement assembly.

4. The auto latch system of claim 3, wherein the latch assembly has a stop plate that limits the pivoting of the handle caused by the spring.

5. The auto latch system of claim 1, wherein the ramp engagement assembly comprises an outwardly directed rod attached to the ramp.

6. An auto latch system for use with a transport vehicle having a bed, a frame disposed about the edge of the bed and a ramp that is pivotable between a transport disposition and an extended disposition, the ramp being pivotably mounted on an edge of the vehicle frame via a mounting arrangement disposed at one edge of the ramp, the auto latch system comprising:
- an outwardly directed rod attached to and extending from the ramps wherein the rod is attached adjacent the mounting arrangement;
- a latch bracket attached to the transport vehicle frame edge of the bed;
- a latch handle assembly pivotably attached to the latch bracket that includes a ramp retention groove formed therein, wherein the latch handle is adapted to be raised by the rod and to engage the outwardly directed rod, adjacent the vehicle frame edge, via the ramp retention groove to retain the ramp in the transport disposition; and
- a spring operably attached to the latch bracket and the latch handle to bias the latch handle towards the outwardly directed rod.

7. The auto latch system of claim 6, wherein the handle also has a groove throat formed therein proximate an entrance to the ramp retention groove, wherein the groove throat has a width that is smaller than a width of the ramp retention groove.

8. The auto latch system of claim 6, wherein the latch assembly has a stop plate that limits the pivoting of the handle caused by the spring.

9. A method of operably mounting a ramp to a transport vehicle having a bed, a frame disposed about the edge of the bed and a ramp, the method comprising:
- mounting a ramp to a transport vehicle frame edge via a mounting arrangement disposed at one edge of the ramp;
- mounting a ramp engagement assembly adjacent the mounting arrangement of the ramp;
- mounting a latch assembly to the transport vehicle frame edge; and
- engaging the ramp engagement assembly adjacent the vehicle frame edge with the latch assembly via a handle pivotably attached to the vehicle frame edge that includes a ramp retention groove, the latch handle being raised by the ramp as the ramp is pivoted from an extended disposition to a transport disposition.

10. The method of claim 9, wherein the latch assembly handle is disposed adjacent the bed.

11. The method of claim 10, and further comprising biasing the latch assembly towards the ramp engagement assembly.

12. The method of claim 11, wherein biasing the latch assembly towards the ramp engagement assembly causes the ramp engagement assembly to seat in the ramp retention groove formed in the latch assembly.

13. The method of claim 12, wherein biasing the latch assembly towards the ramp engagement assembly causes the ramp engagement assembly to pass through a groove throat formed in the latch assembly proximate an entrance to the ramp retention groove, wherein the groove throat has a width that is smaller than a width of the ramp retention groove.

14. The method of claim 10, and further comprising limiting the pivoting of the latch assembly with a stop plate fixedly attached to the transport vehicle.

* * * * *